US012634800B2

(12) United States Patent
Zhang et al.

(10) Patent No.: US 12,634,800 B2
(45) Date of Patent: May 19, 2026

(54) BASE STATION ASSISTED INFORMATION CENTRIC NETWORK

(71) Applicant: Intel Corporation, Santa Clara, CA (US)

(72) Inventors: Yi Zhang, Portland, OR (US); Maruti Gupta Hyde, Portland, OR (US); Nageen Himayat, Fremont, CA (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/856,432

(22) Filed: Jul. 1, 2022

(65) Prior Publication Data

US 2022/0338095 A1     Oct. 20, 2022

(51) Int. Cl.
*H04W 40/24*     (2009.01)
*H04L 45/021*     (2022.01)
*H04W 40/36*     (2009.01)

(52) U.S. Cl.
CPC ......... *H04W 40/248* (2013.01); *H04L 45/021* (2013.01); *H04W 40/36* (2013.01)

(58) Field of Classification Search
CPC .... H04W 40/248; H04W 40/36; H04L 45/021
See application file for complete search history.

(56) References Cited

U.S. PATENT DOCUMENTS

2019/0191330 A1* 6/2019 Dao .................... H04L 12/4633
2021/0360563 A1* 11/2021 Arrobo Vidal ........ H04W 60/00

OTHER PUBLICATIONS

"3GPP 123.501 V17.4", 5GSystem architecture for the 5G System 5GS3GPP TS 23.501 version 17.4.0 Release 17, May 2022, 569 pages.
"3GPP 123.502 V17.4", 5GProcedures for the 5G System 5GS3GPP TS 23.502 version 17.4.0 Release 17, 311 pages.
"ETSI TS 138 413 V17.0.0", 5GNG-RANNG Application Protocol NGAP3GPP TS 38.413 version 17.0.0 Release 17, May 2022, 556 pages.
"Enabling ICN in 3GPP's 5G NextGen Core Architecture", [Online]. Retrieved from the Internet URL https www.ietf.org archive id draft-ravi-icnrg-5gc-icn-04.txt, May 31, 2019, 30 pages.
Sardara, Mauro, "A Transport Layer and Socket API for hICN Design, Implementation and Performance", Sep. 23, 2018, 27 pgs.

* cited by examiner

*Primary Examiner* — Jamal Javaid
(74) *Attorney, Agent, or Firm* — Schwegman Lundberg & Woessner, P.A.

(57) ABSTRACT
System and techniques for base station assisted Information Centric Network (ICN) are described herein. A mobile network base station receives an ICN packet from a user equipment (UE). The mobile network base station identifies an aggregate packet data unit (PDU) session with a user plane function (UPF) ICN gateway (ICN-GW) hosted in a mobile network core network (CN) for the ICN packet. Then, the mobile network base station transmits the ICN packet via the aggregate PDU session.

25 Claims, 10 Drawing Sheets

~ 800

805 —  RECEIVE ICN PACKET FROM UE AT BASE STATION

810 —  SELECT AGGREGATE PDU SESSION FOR ICN PACKET

815 —  TRANSMIT ICN PACKET VIA AGGREGATE PDU SESSION

BASE STATION ASSISTED INFORMATION CENTRIC NETWORK

TECHNICAL FIELD

Embodiments described herein generally relate to computer networking and more specifically to base station assisted Information Centric Network (ICN).

BACKGROUND

Information centric networking (ICN) is a transport layer or internet layer protocol that is an alternative to address based approaches, such as the Internet Protocol (IP). ICN replaces host addresses with named data (or functions in a named function networking (NFN)). ICN nodes generally include two data structures, a pending interest table (PIT) and a forwarding information base (FIB) that are used for routing.

When data is desired, a requestor releases an interest packet naming the data being sought. A receiving ICN node records the interest packet arrival along with the physical interface upon which the interest was received in a PIT entry. The ICN node uses the FIB to determine upon which physical interface to forward the interest. When a node has data that matches the name of the interest packet, such a node generally responds to the interest packet in a data packet (e.g., ICN data packet). When the data packet arrives at an interim node, that node matches the name of the data packet with a PIT entry and uses the physical interface of the PIT entry to forward the data; the PIT entry being removed once the data packet is sent.

Because only the name of the data is necessary, data may be cached throughout the network without orchestration present in host-based techniques. Thus, as a data packet traverses an interim ICN node, that node may cache the data packet to respond to future requests for the same data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
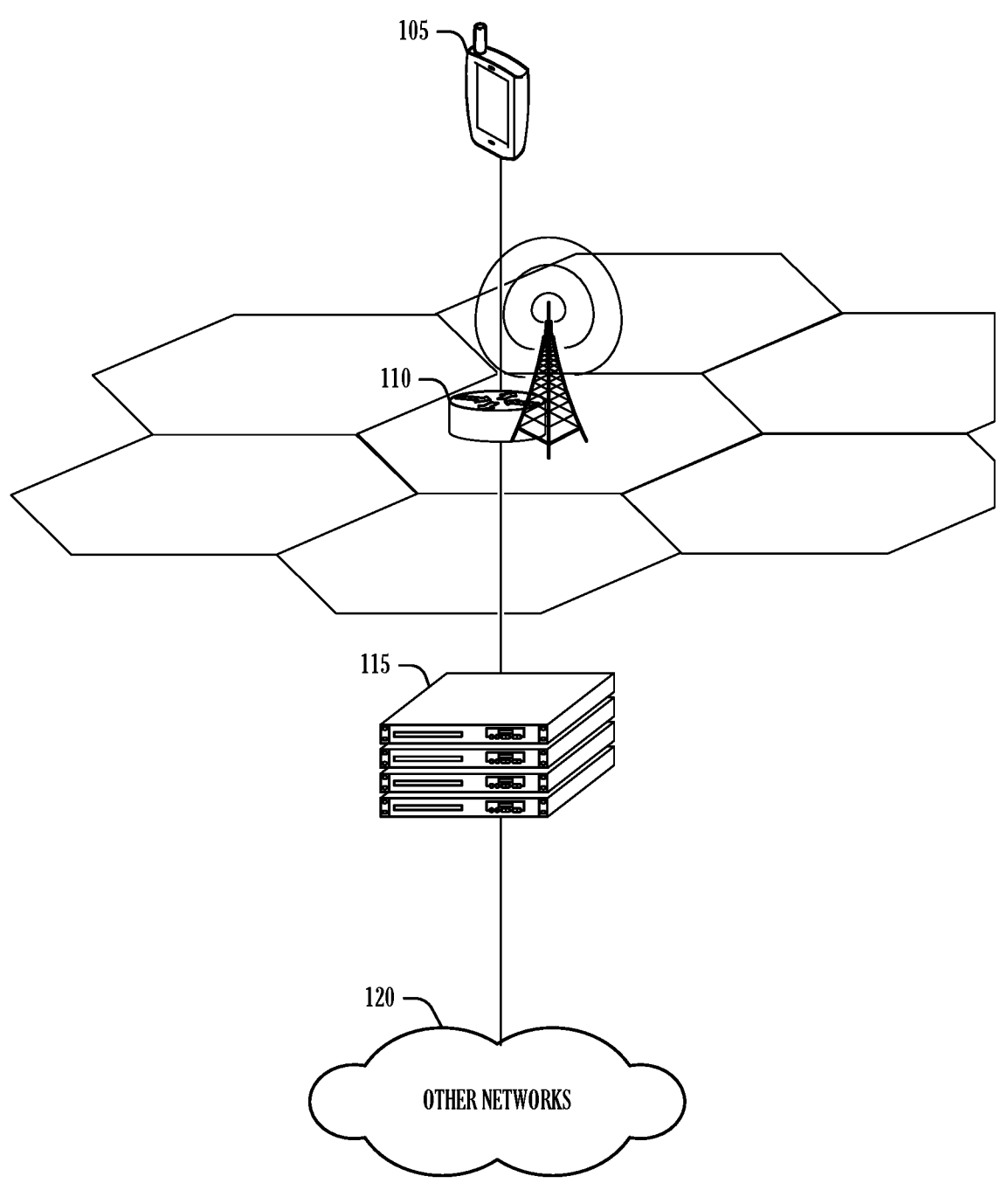
FIG. 1 illustrates an example of an environment including a system for base station assisted ICN, according to an embodiment.

ICN networks enable high network efficiency by providing localized content caching for mobile devices. However, current ICN implementations in mobile networks (e.g., cellular networks) generally involve connecting a UE to a core network (CN) user plane function (UPF) operating as an ICN gateway (ICN-GW). This connection is a packet data unit (PDU) session. ICN is generally operated as an overlay on the mobile network including, often, Internet Protocol (IP) addressed based connections. That is, underlying IP transport infrastructure is not impacted. IP routing is generally used from the Radio Access Network (RAN)—with a mobile network base station (e.g., a gNB) providing the radio link to the UE—to a mobile backhaul, IP core, and UPF. Thus, the UE attaches to the UPF (e.g., a PDU Anchor) using an IP address. The Content provider in a Data Network (DN) may serve content either using IP or ICN based on a UE request. An alternative approach may implement a Hybrid ICN in which ICN is run over IP by mapping ICN names to the IPv4 or IPv6 addresses. Thus, in an example, from the perspective of the UE, the UE is not aware of the aggregate PDU session. Rather, the UE encapsulates the ICN packet like any other packets, such as putting an ICN packet on top of a UDP socket and then on top of an IP packet. When the mobile network base station receives the packet, the mobile network base station reads the IP header and determines whether the packet is an ICN packet or not. In an example, this information is provided by ab IP packet header, such as in a "protocol" field, to differentiate ICN packets from other IP packets.

The current ICN implementations in mobile networks fall short of realizing the potential of ICN. For example, when the ICN packets are running on top of the end-to-end PDU session—from one end, the UE, to the other end of the UPF/ICN-GW—by passing common UE traffic intersection points such as the mobile network base station does not permit data caching or interest packet aggregation until well into the CN at the UPF/ICN-GW. Thus, for example, multiple interest packets from different UEs that are requesting the same content are still transmitted from UEs to the UPF/ICN-GW through different PDU sessions because the end-to-end PDU session is established on a per-UE basis.

To address the issues above, the mobile network base station is configured to manage an aggregate PDU session for ICN traffic. The aggregate PDU session operates as an ICN interface between the mobile network base station and the CN, such as the UPF/ICN-GW. This arrangement enables the mobile network to perform interest aggregation and data caching at the mobile network base station without disrupting much of the established mobile network infrastructure. Thus, instead of a per-UE end-to-end PDU session between each UE and UPF/ICN-GW, the mobile network base station, on behalf of UEs which are connecting to the mobile network base station, sets up a per-base station aggregate PDU session to the UPF/ICN-GW to transmit the ICN packets.

When the mobile network base station implements ICN routing with an aggregate PDU session, if the mobile network base station receives multiple similar interest packets from multiple UEs, the interests may be aggregated into a single up-stream interest packet sent to the UPF/ICN-GW. Similarly, if the content is already cached at the mobile network base station, the mobile network base station may serve the content from the local cache without communicating with the UPF/ICN-GW.

Implementing ICN router functionality on a mobile network base station coupled to aggregate PDU sessions in lieu of traditional end-to-end PDU sessions strikes a balance between exploiting the advantages inherent in ICN networks over other network models while minimizing mobile network modifications. The aggregate PDU session enables Pending Interest Table (PIT) aggregation and data caching at the mobile network base station. Accordingly, the benefits of ICN are leveraged to reduce unnecessary interest or data packet transmission through the network. In an example, the aggregate PDU session restricted to ICN packets only, and, in an example, differentiated from other PDU sessions with a PDU session type. This enables the UPF/ICN-GW to automatically differentiate the incoming packets as ICN packets without reading the packet headers. Additional details and examples are provided below.

FIG. 1 illustrates an example of an environment including a system for base station assisted ICN, according to an embodiment. As illustrated, the user equipment (UE) 105 is connected via radio link to a mobile network base station 110. The mobile network base station 110 is in turn connected to the mobile network core network (CN) 115. The CN 115 may then connect to other networks 120, such as the Internet, corporate networks, defense networks, etc.

The mobile network base station 110 includes hardware to operate the radio link to the UE 105 (e.g., a radio interface) as well as communicate with components of the CN 115, which may include wired or wireless network interfaces. The mobile network base station 110 includes memory (e.g., working memory to hold a current system state or storage for volatile or non-volatile storage of data) and processing circuitry (e.g., as described below with respect to FIG. 10). In an example, the mobile network base station 110 is a gNB in accordance with a Third-Generation Partnership Project (3GPP) family of standards. A gNB, which in some iterations of the 3GPP standard family may be referred to as an eNB, and eNodeB, or an enhanced Node B, represents a fifth generation (5G) radio access network (RAN) component for UE 105 access to the CN 115. Although the examples herein generally refer to the mobile network base station 110 as a gNB in the context of a 5G mobile network, the described devices and techniques are applicable to other mobile network configurations, such as fourth generation (4G) and earlier 3GPP networks.

To implement a base station assisted ICN, the processing circuitry is configured to receive (e.g., via the radio interface) an ICN packet from the UE 105. In an example, the processing circuitry determines that any given packet received from the UE 105 is an ICN packet based on an explicit signal provided by the UE. Such a signal may include a flag in the packet or may be a request in preparation for sending an ICN packet. In an example, the UE 105 provides no explicit signaling that the packet is an ICN packet. In this example, the processing circuitry may determine that the packet is an ICN packet by inspection of a packet header, packet contents, or the like. In any case, the processing circuitry is configured to classify the packet as an ICN packet and treat the packet differently than other packet types, such as an IP packet.

Figure 9:
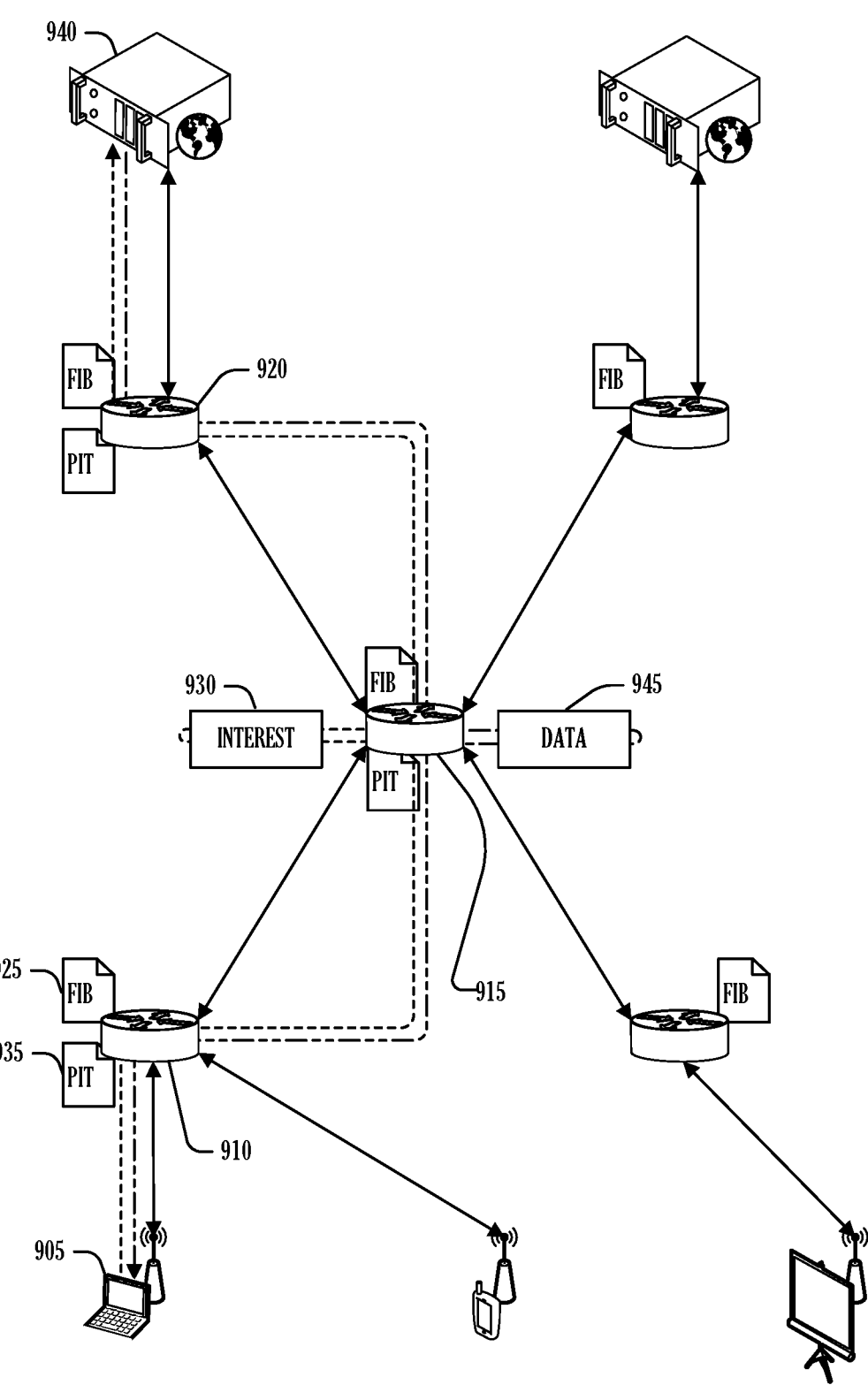
FIG. 9 illustrates an example information centric network (ICN), according to an embodiment.

In an example, the mobile network base station 110 includes a PIT. The PIT is maintained in the memory of the mobile network base station 110 and, as discussed below with respect to FIG. 9, is a data structure that maintains a relationship between received interest packets and an interface into which that interest packet was received. Although the radio interface is the physical interface upon which interest packets are received from multiple UEs, in the context of most wireless networks, including 5G networks, the mobile network base station 110 generally addresses radio communications to specific UEs. In the context of a 5G network, this mechanism involves the allocation of Data Radio Bearer (DRB) time-frequency blocks to a UE and transmission of data for that UE. Accordingly, the PIT maintains a correlation between an interest received from the UE 105 and the UE 105 itself as the receiving interface. Accordingly, in an example, where the ICN packet is an interest packet with a name identifying content, the processing circuitry is configured to place the interest packet in the PIT upon receipt.

Interest aggregation in ICN is a concept whereby multiple interest packets received for content (e.g., multiple interest packets with equivalent names) are not forwarded in search of the content. Rather, while a first of these multiple interest packets is pending (e.g., in the PIT and unexpired or unfulfilled) subsequent interest packets are not forwarded (e.g., to the core network 115). Rather, additional entries for in-bound interfaces (e.g., UEs) are made in the PIT in order to deliver any responding data packet to all interested devices. Accordingly, in an example—when a second interest packet is received subsequent to the interest packet, and the second interest packet has the same name as the first interest packet to identify the same content—the processing circuitry is configured to drop the second interest packet in response to the first interest packet already being in the PIT. In an example, the processing circuitry is configured to update the PIT with a second UE as the inbound interface for the entry corresponding to the interest packet.

As with other ICN nodes, the mobile network base station 110 may provide more efficient data access for the UEs connected to the mobile network base station 110 by caching data. Thus, in an example, the mobile network base station 110 includes a cache (e.g., in memory) with entries that each include a name and corresponding content. In an example, a second ICN packet is received from the UE. Here, the second ICN packet is an interest packet with a name specifying content. The processing circuitry is configured to match name with an entry in the cache. The processing circuitry is configured to retrieve the entry (or just the content) based on matching the name. The processing circuitry is configured to respond to the interest packet with a data packet that includes the content. In an example, the mobile network base station does not transmit the interest packet via an aggregate PDU session (as described below) when responding to the interest packet with content from the cache. This set of examples demonstrates the ability of the network to avoid sending interest packets and data packets when locally caching of the data at the mobile network base station 110 has occurred. In general, such packet transmission reductions greatly improve network efficiency.

The processing circuitry is configured to identify an aggregate packet data unit (PDU) session. PDU sessions operate in 3GPP networks to provide an end-to-end connectivity between the UE 105 and a data network (DN) hosted in the CN 115. Traditionally, an ICN PDU session was used to provide connectivity between ICN facilities on the UE 105 and an UPF/ICN-GW in the CN 115. Different from traditional mobile networks, however, the aggregate PDU that does not terminate with the UE 105, but rather with the mobile network base station 110. In this context, the aggregate PDU session is used as an upstream ICN interface upon which ICN packets are forwarded. Because there may be multiple UPF/ICN-GWs in the CN 115, and there may be multiple Quality-of-Service (QoS) levels, each with an associated with a flow of an aggregate PDU session, the processing circuitry is configured to identify which of multiple possible PDU sessions or flows within a PDU session upon which to forward the ICN packet.

The aggregate PDU session may not be maintained (e.g., not instantiated or shutdown from a previous use) when there are not ICN packets being received at the mobile network base station 110. Accordingly, in an example, the aggregate PDU session is established in response to receiving the ICN packet. In an example, when the mobile network base station is a gNB in accordance with a 3GPP family of standards, the aggregate PDU session is established over an N3 GTP-U tunnel in accordance with the 3GPP family of standards. If, however, an aggregate PDU session has already been established—e.g., because a second UE previously sent an ICN packet and a time period to close the aggregate PDU session has not yet elapsed—the aggregate PDU session is not established when the ICN packet is received. Rather, in this example, the processing circuitry is configured to select an appropriate aggregate PDU session for the ICN packet. In this context, the appropriateness of the selected aggregate PDU session may be governed by local metrics on forward routes, such as may be maintained in the PIT for data packets or a FIB for interest packets.

With respect to establishing the aggregate PDU session, UE handover may provoke such establishment. Thus, in an example, the processing circuitry receives a notification of a handover of the UE 105 to the mobile network base station 110. In an example, the notification indicates that the UE has the aggregate PDU session (e.g., established at the previous or current mobile network base station). In an example, the processing circuitry is configured to establish the aggregate PDU session in response to the notification indicating the aggregate PDU session.

In an example, the aggregate PDU session is one of multiple aggregate PDU sessions established by the processing circuitry. In an example, each of the multiple aggregate PDU sessions is established with a different ICN-GW within the CN 115. In an example, the ICN packet is an interest packet. Here, the processing circuitry is configured to identify the aggregate PDU session for the ICN packet by using a name contained in the ICN packet to locate an entry in the FIB of the mobile network base station 110. From this entry, the processing circuitry obtains the aggregate PDU session.

Once the aggregate PDU session is identified for an ICN packet, the processing circuitry is configured to transmit the ICN packet using the aggregate PDU session. In an example, where the aggregate PDU session includes multiple flows corresponding to different QoS levels, transmitting the ICN packet via the aggregate PDU session includes selecting a flow with a corresponding QoS level. In this manner, the mobile network base station 110 provides data caching and interest aggregation for connected UEs, including the UE 105, reducing both radio resource and CN 115 network utilization. Because the PDU sessions are leveraged, there is no change to the operation of the CN 115 or the UE 105.

Accordingly, ICN efficiencies may be achieved without significant redesign or implementation burdens on a network operator.

Figure 2:
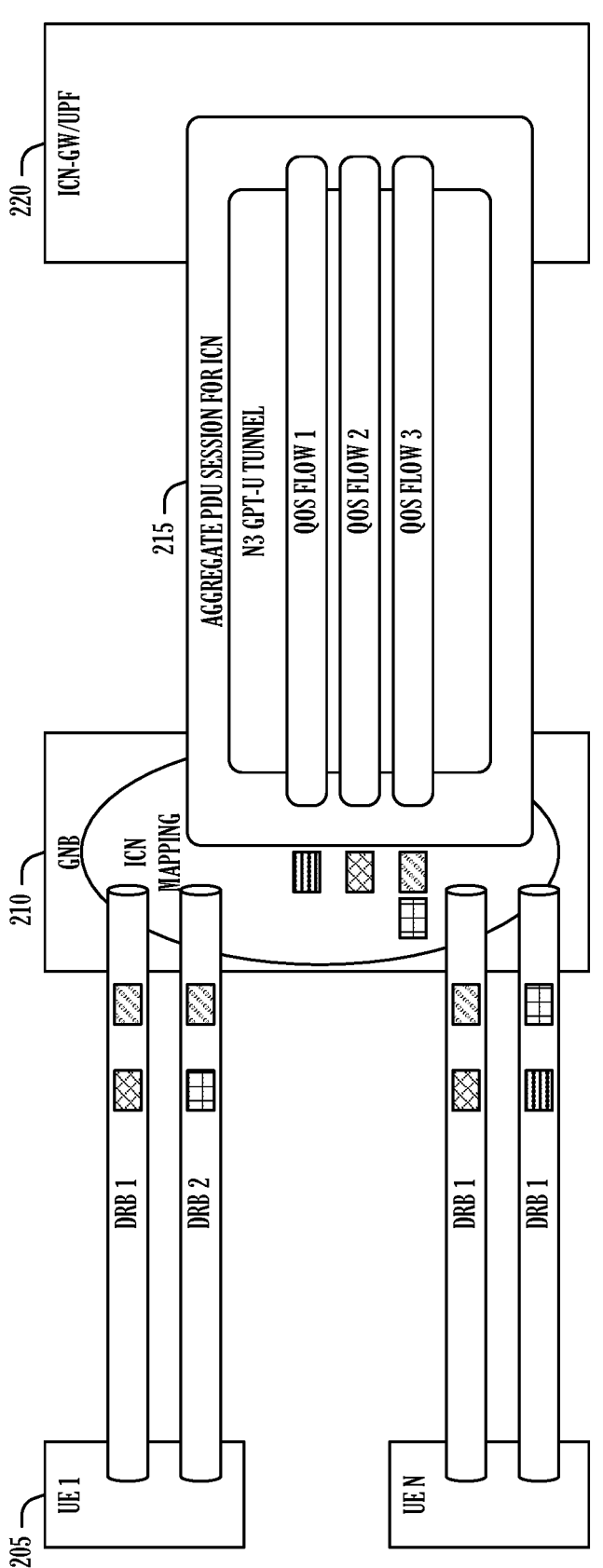
FIG. 2 illustrates an example of an aggregate packet data unit (PDU) session hosted at a base station, according to an embodiment.

FIG. 2 illustrates an example of an aggregate PDU session hosted at a base station, according to an embodiment. As illustrated, the UE 205 transmits ICN packets on two DRBs. These ICN packets are received at the gNB 210 wherein an ICN mapping (e.g., PIT, FIB, or the like) is applied to identify the aggregate PDU session 215 (and possibly one of the QoS flows of the aggregate PDU session 215) that will be used to transmit the ICN packet to the UPF/ICN-GW 220.

As noted above, the gNB 210 is configured to identify ICN packets from the UE 205. The gNB 210 is configured to provide interest aggregation or content caching functionality when it receives ICN interest packets from different UEs. The gNB 210 sets up one PDU session on behalf of all the ICN UEs that are accessing the network through this gNB 210 with the UPF/ICN-GW 220. Different aggregate PDU sessions may be setup to different UPFs/ICN-GWs. In an example, the aggregate PDU session 215 is differentiated with from traditional (e.g., end-to-end) PDU sessions by an "aggregate" flag, signal, or other information.

Figure 3:
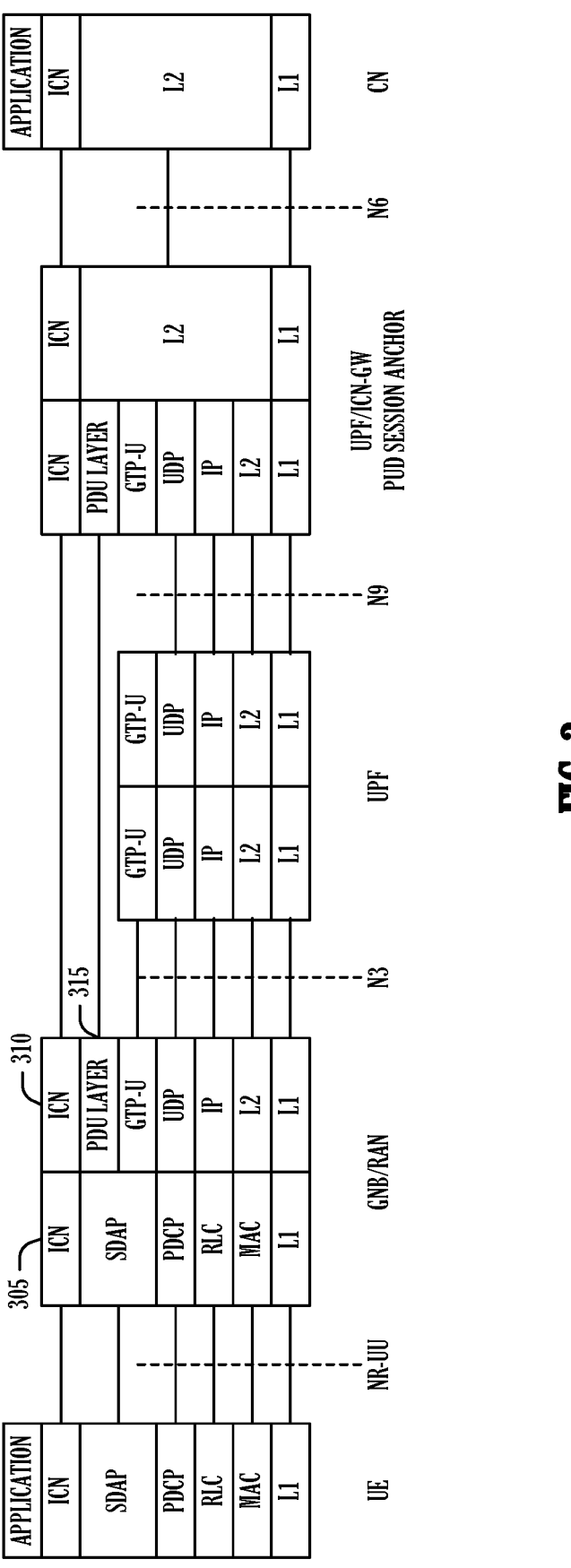
FIG. 3 illustrates an example of an ICN deployment with aggregate PDU session in a mobile network, according to an embodiment.

FIG. 3 illustrates an example of an ICN deployment with aggregate PDU session in a mobile network, according to an embodiment. The illustrated arrangement generally conforms to 5G network design. As illustrated, the network stack components become more sophisticated the higher in the network stack. Thus, the L1 blocks represent physical layer while the application layer sits at the top of the UE and CN end points. As opposed to traditional 5G networks, the gNB includes several additional components. Specifically, the gNB includes the PDU layer 315 in order to establish and maintain aggregate PDU sessions. This, coupled with the UE facing ICN block 305 and the CN facing ICN block 310, enables the gNB to provide the ICN network efficiencies described herein.

In the context of the illustrated arrangement, the gNB sets up the aggregate PDU session (via the PDU layer 315) between the gNB and the UPF (e.g., UPF/ICN-GW) for transmitting ICN packets collected and aggregated from multiple UEs. As illustrated in FIG. 2, there may be multiple QoS flows setup in the aggregate PDU session for ICN packets with different QoS settings. The ICN packets may come from the same or different DRBs/UEs.

The gNB receives and aggregates the ICN interest packets which request the same content (e.g., use the same name or an equivalent name) under its coverage, for example, using the ICN block 305. The aggregated ICN interest packets may be mapped to a QoS flow according to the QoS specifications of the ICN packets. ICN data packets from UEs may also mapped to QoS flows according to the QoS settings. The ICN block 310 may extract ICN packets (interest or data packets) from the network via the aggregate PDU session and forward (e.g., via the ICN block 305) these ICN packets to different UEs in its coverage.

In an example, the gNB implements a PIT, a FIB, and an ICN cache (e.g., local store). Here, the PIT is used for interest aggregation and the FIB is use forward routing of interest packets, such as which aggregate PDU session to use or which neighbor gNB to use for interest packet forwarding. In an example, where the gNB is limited to a single aggregate PDU session—for example, if there is only one UPF/ICN-GW gNB that may connect with the gNB and there is no neighbor gNB with ICN enabled—the gNB may include a PIT and an ICN cache but not the FIB.

QoS may be handled much like a traditional PDU session with the exception that the aggregate PDU session terminates at the gNB. Thus, like a traditional PDU session, multiple QoS flows may be setup within the aggregate PDU session to support different ICN QoS levels. ICN packets with different QoS settings may be mapped to different QoS flows. If different UEs assign different QoS levels to interest packets for similar content, gNB may aggregate the interest packets and assign the highest QoS level requested by a UE.

In general, the aggregate PDU session is specific to ICN traffic. Thus, other network protocols that use PDU sessions, such as IP packet transmission, may continue to use traditional PDU sessions with end-to-end per-UE and DN arrangements.

Figure 4:
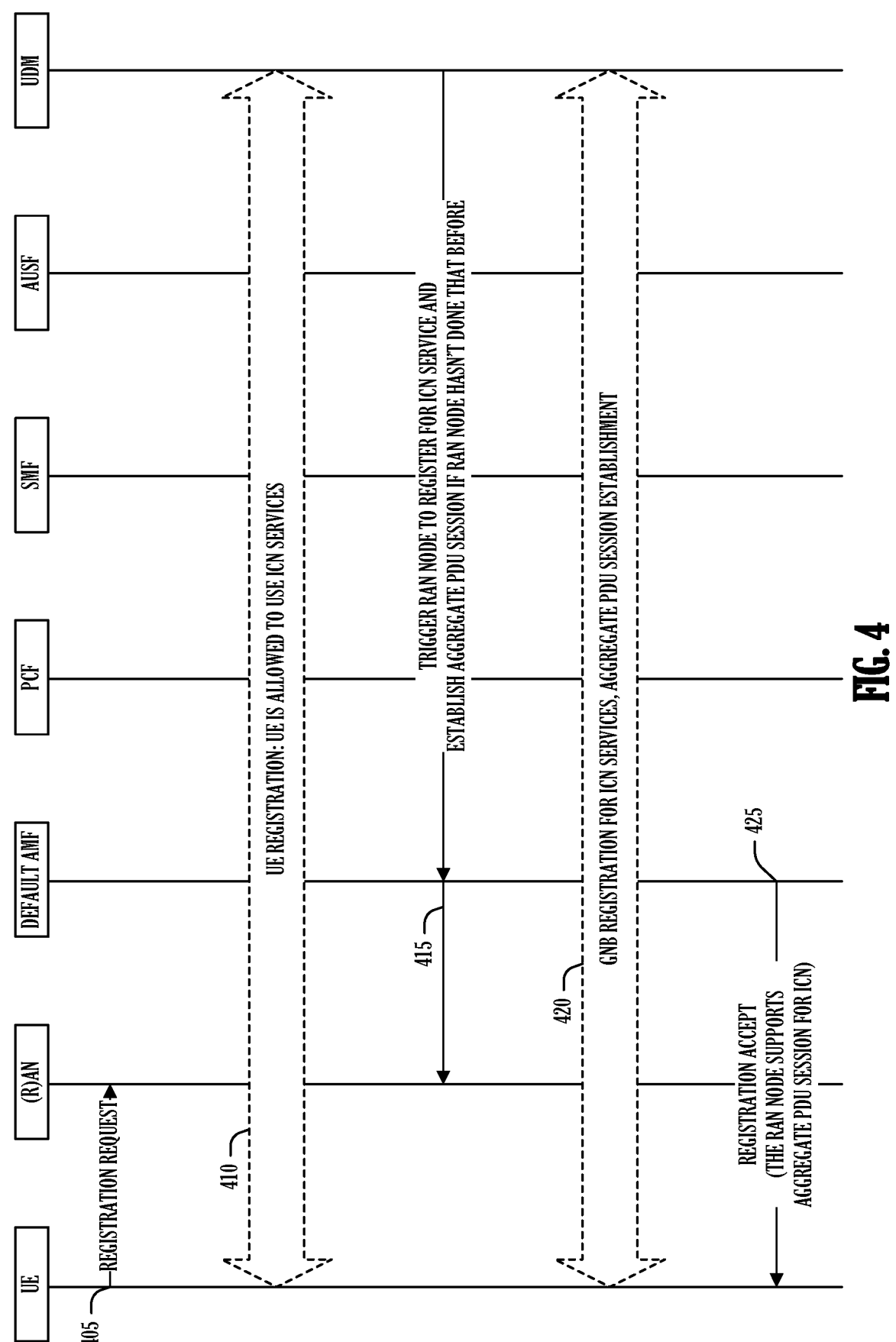
FIG. 4 illustrates an example of component interactions for ICN User Equipment (UE) registration, according to an embodiment.

FIG. 4 illustrates an example of component interactions for ICN-User Equipment (UE) registration, according to an embodiment. ICN-UE registration authenticates or authorizes the UE to ICN services. In the registration request 405, the UE provides information—such as that carried in a Requested Network Slice Selection Assistance Information (NSSAI) or UE capability communication—to indicate that the UE supports ICN features. When the UE registration request is accepted (exchange 410), After the registration, Access and Mobility Management Function (AMF) and gNB shall store the UE's ICN-related context and the gNB is triggered to establish the aggregate PDU session (communication 415). The gNB may then establish the aggregate PDU session (exchange 420). At this point, the UE may be notified that the registration is accepted and that the RAN (e.g., gNB) supports ICN (communication 425). In an example, the gNB may be considered a virtual UE with respect to the aggregate PDU session.

Figure 5:
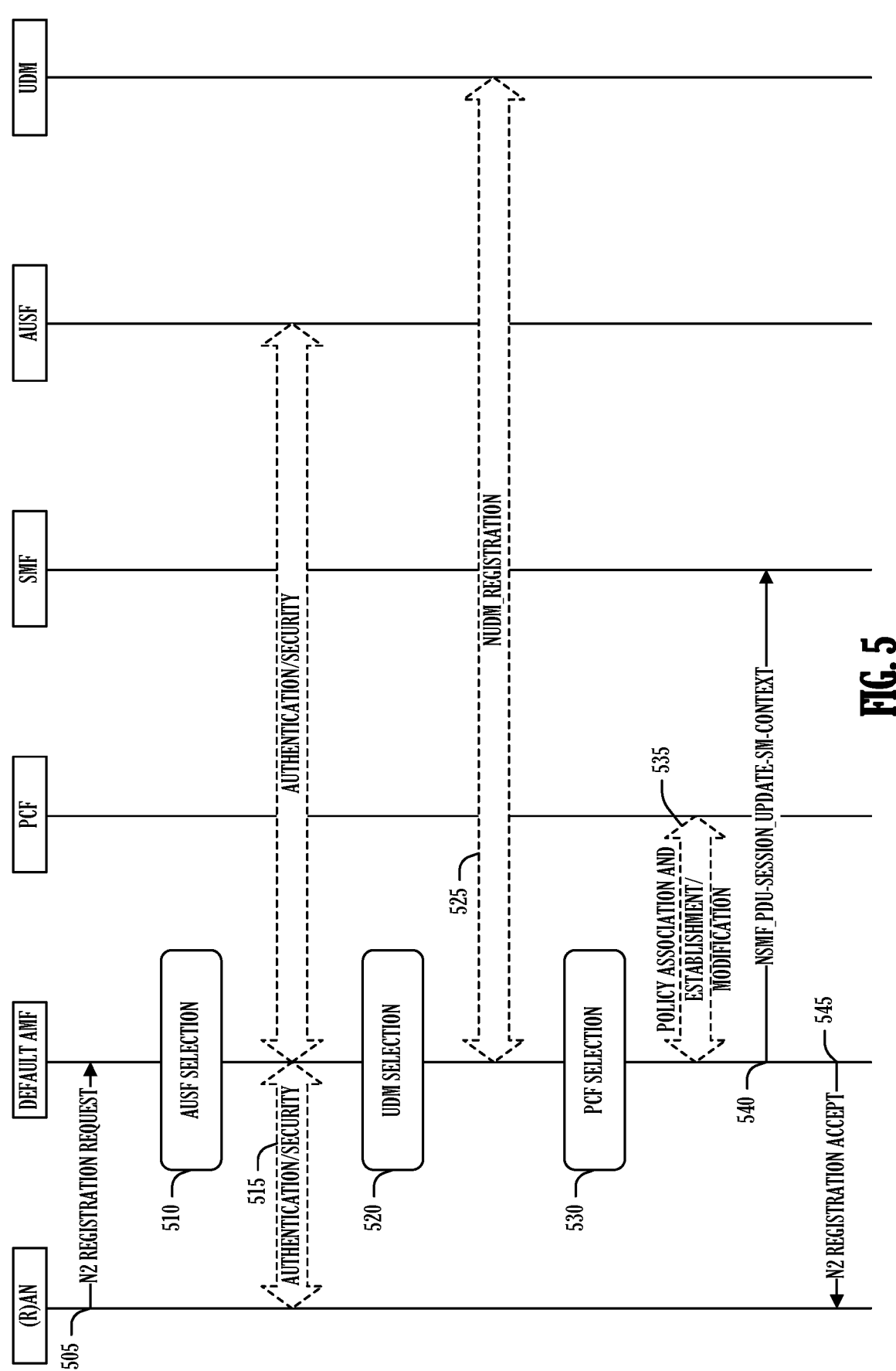
FIG. 5 illustrates an example of gNB aggregate PDU registration, according to an embodiment.

FIG. 5 illustrates an example of gNB aggregate PDU registration, according to an embodiment. gNB aggregate PDU registration registers the gNB (e.g., as a virtual ICN UE) to verify whether the gNB may operate as a virtual ICN UE and to set up an aggregate PDU session. The gNB aggregate PDU registration may also obtain authorization to receive ICN services. Similar to UE registrations, gNB registration for the ICN service is generally a one-time registration that does not produce much overhead to the network.

As illustrated, the Registration Request/Accept (communication 505) are N2 message that may be carried in either a new NG Application Protocol (NGAP) messages or existing NGAP messages, such as Downlink NAS Transport or Uplink NAS Transport messages. The N2 Registration Request/Accept 505 is similar to NAS Registration Request/Accept and may include the following information elements:

Message Type

AMF UE NGAP ID

RAN UE NGAP ID: this is a virtual UE NGAP ID assigned for gNB

5GS Registration Type: gNB registration on behalf of ICN UE

5GS Mobility Identity: this is a virtual mobility identify assigned for gNB

The 3GPP authentication function (AUSF) is selected (operation 510) and authentication of the gNB carried out (exchange 515). After authentication, a 3GPP Unified Data Manager (UDM) is selected (operation 520) and NUDM (5G UDM) registration occurs (exchange 525). A 3GPP Policy Control Function (PCF) is then selected (operation 530) and a policy is established (exchange 535). Then, the 3GPP Session Management Function (NSMF) context is established (communication 540) and the gNB is notified that the registration is accepted (communication 545).

Figure 6:
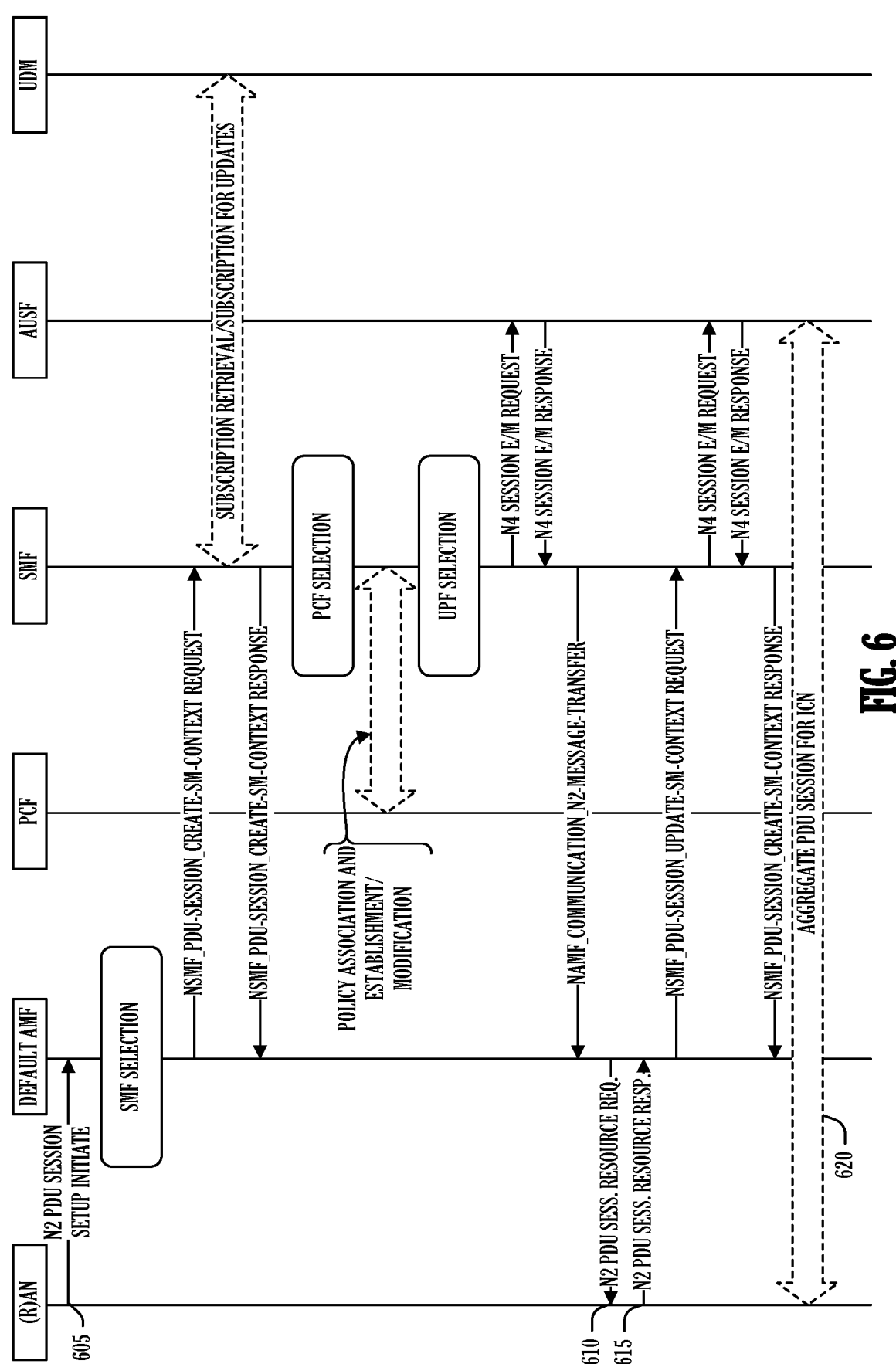
FIG. 6 illustrates an example of gNB aggregate PDU session establishment, according to an embodiment.

FIG. 6 illustrates an example of gNB aggregate PDU session establishment, according to an embodiment. Aggregate PDU session management includes aggregate PDU session establishment, modification, and release between the gNB and the UPF/ICN-GW. In an example, existing 3GPP NG Application Protocol (NGAP) is modified to support gNB or CN initiated PDU session establishment, modification, or release. In this example, PDU session management related Information Elements (IEs) are carried in NGAP directly. An example of PDU session setup is illustrated in FIG. 6. Here, the new NGAP or modified NGAP messages are:

a. N2 PDU Session Setup Initiate (communication 605);

b. N2 PDU Session Resource Request (communication 610); and c. N2 PDU Session Resource Response (communication 615).

The other illustrated elements conform to standard 3GPP PDU session management with the exception of the existence of the aggregate PDU session (exchange 620).

In an example, existing Non-Access-Stratum (NAS) messages may be used for PDU session management. In this example, the gNB is configured to operate on (e.g., can understand or generate) NAS message. As mentioned above, aggregate PDU session management does not impact the traditional PDU session management for UEs.

Figure 7:
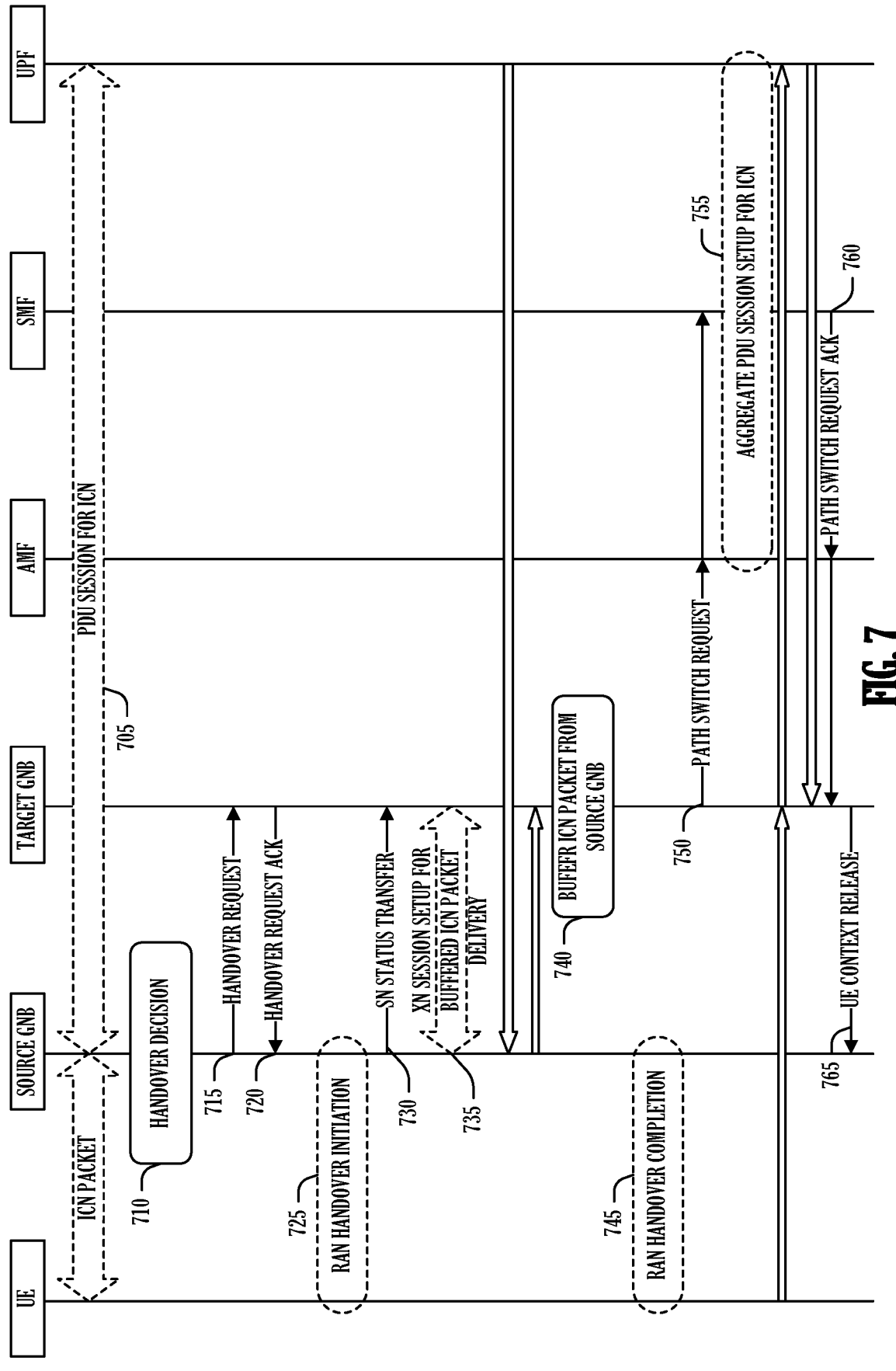
FIG. 7 illustrates an example of aggregate PDU session handover, according to an embodiment.

FIG. 7 illustrates an example of aggregate PDU session handover, according to an embodiment. This may also be called mobility management. In general, the ICN UE performs 3GPP standard registration and mobility tracking. If an ICN UE moves from one gNB to another in Radio Resource Control (RRC) RRC_Connected mode, the aggregate PDU session will be setup in the new gNB is it is not already setup. If an aggregate PDU session has been setup, the transmission of ICN packet in the new gNB may be mapped to this aggregate PDU session.

As illustrated, the aggregate PDU session (exchange 705) is operating at the source (e.g., current) gNB. When the handover decision is made (operation 710), the source gNB makes a handover request (communication 715) to the target (e.g., new) gNB, which is then acknowledged (communication 720). RAN handover is initiated (period 725) and the source gNB transfers status to the target gNB (communication 730). This prompts session setup to transfer ICN packets (exchange 735) to the target gNB. The target gNB buffers the pending ICN packets (operation 740) until RAN handover is complete (period 745). The target gNB then makes a path switch request (communication 750) and the aggregate PDU session is established (period 755). Once complete, an acknowledgment is received by the target gNB (communication 760) and the source gNB is notified (communication 765) that it may release the UE context, the handover having been completed.

Figure 8:
FIG. 8 illustrates a flow diagram of an example of a method for base station assisted ICN, according to an embodiment.
Figure 8:
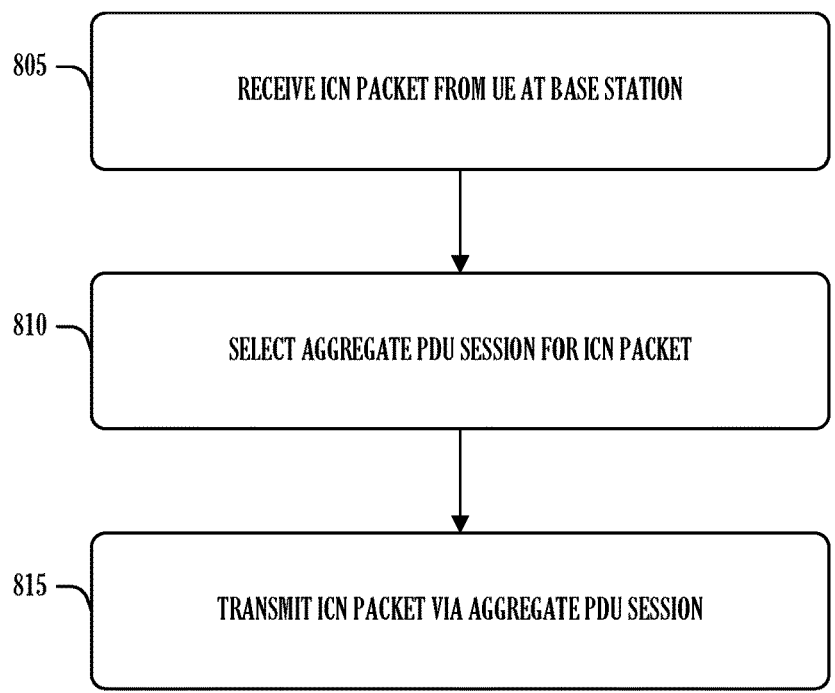

FIG. 8 illustrates a flow diagram of an example of a method 800 for base station assisted ICN, according to an embodiment. The operations of the method 800 are performed by computational hardware, such as that described above or below (e.g., processing circuitry).

At operation 805, an ICN packet is received at a mobile network base station from a UE. In an example, the mobile network base station is a gNB in accordance with a Third-Generation Partnership Project (3GPP) family of standards.

In an example, the mobile network base station includes a PIT. In an example, the ICN packet is an interest packet with a name identifying content. In an example, the interest packet is placed in the PIT upon receipt. In an example, a second interest packet is received subsequent to the interest packet. In this example, the second interest packet has the same name as the first interest packet to identify the same content. In an example, the second interest packet is dropped in response to the first interest packet already being in the PIT.

In an example, the mobile network base station includes a cache with entries that each include a name and corresponding content. In an example, a second ICN packet is received from the UE. Here, the second ICN packet is an interest packet with a name specifying content. The name may be matched with an entry in the cache. Content in the entry may then be retrieved based on matching the name. The mobile network base station may then respond to the interest packet with a data packet that includes the content. In an example, the mobile network base station does not transmit the interest packet via an aggregate PDU session (as described below) when responding to the interest packet with content from the cache.

At operation 810, an aggregate packet data unit (PDU) session is identified with a user plane function (UPF) ICN gateway (ICN-GW) hosted in a mobile network core network (CN) for the ICN packet. In an example, the aggregate PDU session includes multiple flows. In an example, each of the multiple flows corresponds to a quality-of-service (QoS) level.

In an example, the aggregate PDU session is established in response to receiving the ICN packet. In an example, the aggregate PDU session is not established when the ICN packet is received. In an example, when the mobile network base station is a gNB in accordance with a 3GPP family of standards, the aggregate PDU session is established over an N3 GTP-U tunnel in accordance with the 3GPP family of standards.

In an example, the mobile network base station receives a notification of a handover of the UE to the mobile network base station. In an example, the notification indicates that the UE has the aggregate PDU session (e.g., established at the previous or current mobile network base station). In an example, the mobile network base station establishes the aggregate PDU session in response to the notification indicating the aggregate PDU session.

In an example, the aggregate PDU session is one of multiple aggregate PDU sessions established by the mobile network base station. In an example, each of the multiple aggregate PDU sessions is established with a different ICN-GW within the CN. In an example, the ICN packet is an interest packet. Here, identifying the aggregate PDU session for the ICN packet may include includes using a name contained in the ICN packet to locate an entry in a forwarding information base (FIB) of the mobile network base station. Then, the aggregate PDU session may be identified from the entry in the FIB.

At operation 815, the ICN packet is transmitted via the aggregate PDU session. In an example, where the aggregate PDU session includes multiple flows correspond to different QoS levels, transmitting the ICN packet via the aggregate PDU session includes selecting a flow with a corresponding QoS level.

FIG. 9 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 905 (e.g., subscriber) requests named content from the network itself. The content request may be called an interest and transmitted via an interest packet 930. As the interest packet traverses network devices (e.g., network elements, routers, switches, hubs, etc.)—such as network elements 910, 915, and 920—a record of the interest is kept, for example, in a pending interest table (PIT) at each network element. Thus, network element 910 maintains an entry in its PIT 935 for the interest packet 930, network element 915 maintains the entry in its PIT, and network element 920 maintains the entry in its PIT.

When a device, such as publisher 940, that has content matching the name in the interest packet 930 is encountered, that device 940 may send a data packet 945 in response to the interest packet 930. Typically, the data packet 945 is tracked back through the network to the source (e.g., device 905) by following the traces of the interest packet 930 left in the network element PITs. Thus, the PIT 935 at each network element establishes a trail back to the subscriber 905 for the data packet 945 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 930 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 930 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 930 to data cached in the ICN element. Thus, for example, if the data 945 named in the interest 930 is cached in network element 915, then the network element 915 will return the data 945 to the subscriber 905 via the network element 910. However, if the data 945 is not cached at network element 915, the network element 915 routes the interest 930 on (e.g., to network element 920). To facilitate routing, the network elements may use a forwarding information base 925 (FIB) to match named data to an interface (e.g., physical port) for the route. Thus, the FIB 925 operates much like a routing table on a traditional network device.

In an example, additional meta-data may be attached to the interest packet 930, the cached data, or the route (e.g., in the FIB 925), to provide an additional level of matching. For example, the data name may be specified as "www.some-domain.com or videos or v8675309," but also include a version number—or timestamp, time range, endorsement, etc. In this example, the interest packet 930 may specify the desired name, the version number, or the version range. The matching may then locate routes or cached data matching the name and perform the additional comparison of meta-data or the like to arrive at an ultimate decision as to whether data or a route matches the interest packet 930 for respectively responding to the interest packet 930 with the data packet 945 or forwarding the interest packet 930.

ICN has advantages over host-based networking because the data segments are individually named. This enables aggressive caching throughout the network as a network element may provide a data packet 930 in response to an interest 930 as easily as an original author 940. Accordingly, it is less likely that the same segment of the network will transmit duplicates of the same data requested by different devices.

Fine grained encryption is another feature of many ICN networks. A typical data packet 945 includes a name for the data that matches the name in the interest packet 930. Further, the data packet 945 includes the requested data and may include additional information to filter similarly named data (e.g., by creation time, expiration time, version, etc.). To address malicious entities providing false information under the same name, the data packet 945 may also encrypt its contents with a publisher key or provide a cryptographic hash of the data and the name. Thus, knowing the key (e.g., from a certificate of an expected publisher 940) enables the recipient to ascertain whether the data is from that publisher 940. This technique also facilitates the aggressive caching of the data packets 945 throughout the network because each data packet 945 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 10:
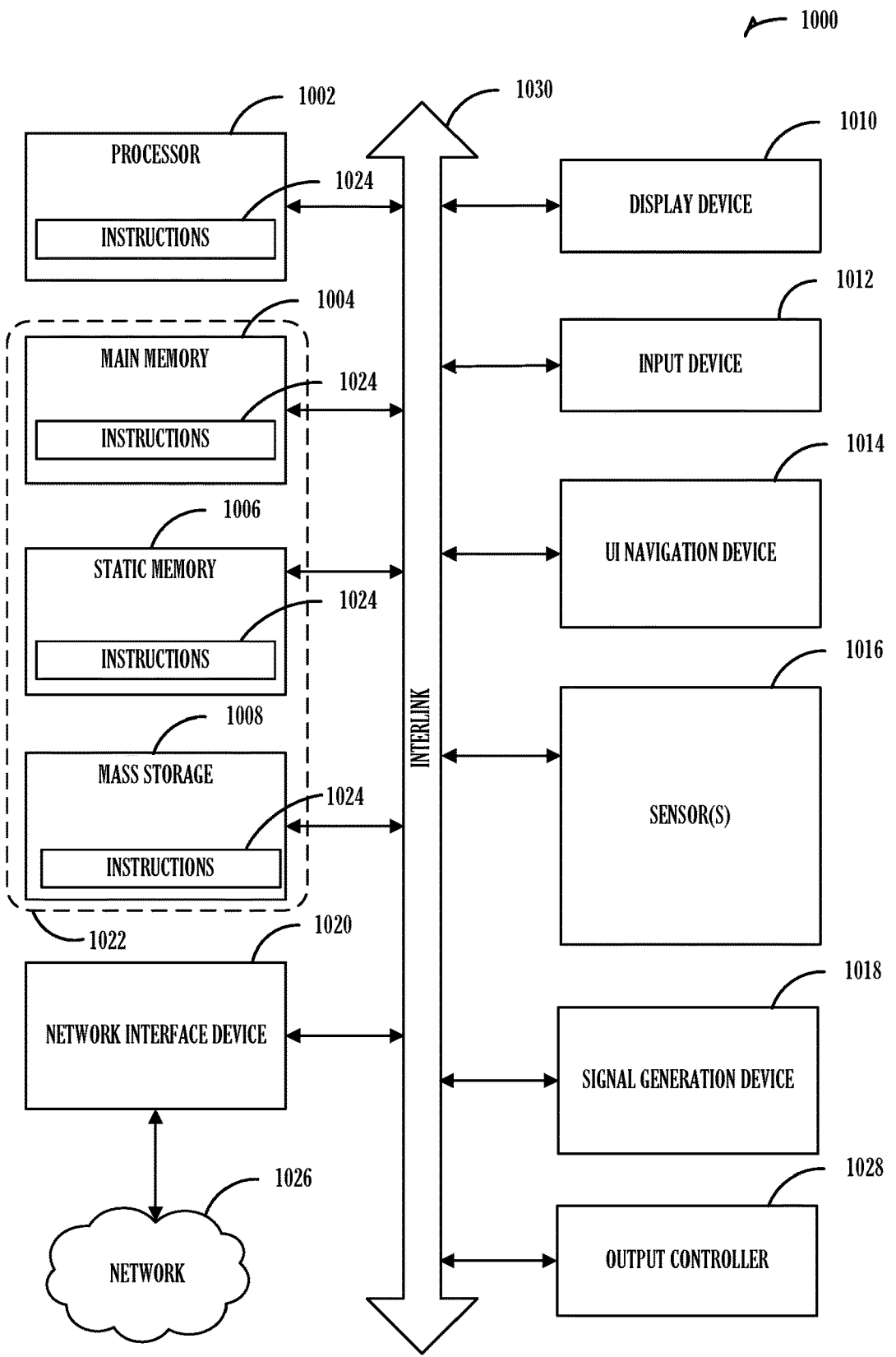
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 may be representative of the instructions 1024, such as instructions 1024 themselves or a format from which the instructions 1024 may be derived. This format from which the instructions 1024 may be derived may include source code, encoded instructions (e.g., in compressed or encrypted form), packaged instructions (e.g., split into multiple packages), or the like. The information representative of the instructions 1024 in the machine readable medium 1022 may be processed by processing circuitry into the instructions to implement any of the operations discussed herein. For example, deriving the instructions 1024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 may include assembly, compilation, or interpretation of the information (e.g., by the processing circuitry) to create the instructions 1024 from some intermediate or preprocessed format provided by the machine readable medium 1022. The information, when provided in multiple parts, may be combined, unpacked, and modified to create the instructions 1024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., mobile networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

Additional Notes & Examples

Example 1 is a device for base station assisted information centric network (ICN), the device comprising: a memory including instructions; and processing circuitry that, when in operation, is configured by the instructions to: receive, at a mobile network base station, an ICN packet from a user equipment (UE); identify an aggregate packet data unit (PDU) session with a user plane function (UPF) ICN gateway (ICN-GW) hosted in a mobile network core network (CN) for the ICN packet; and transmit the ICN packet via the aggregate PDU session.

In Example 2, the subject matter of Example 1 includes, wherein the instructions further configure the processing circuitry to: establish the aggregate PDU session in response to receiving the ICN packet, wherein the aggregate PDU session is not established when the ICN packet is received.

In Example 3, the subject matter of Examples 1-2 includes, wherein the instructions further configure the processing circuitry to: receive notification of a handover of the UE to the mobile network base station, the notification indicating the aggregate PDU session; and establish the aggregate PDU session in response to the notification indicating the aggregate PDU session.

In Example 4, the subject matter of Examples 1-3 includes, wherein the mobile network base station includes a pending interest table (PIT), wherein the ICN packet is an interest packet with a name identifying content, and wherein the interest packet is placed in the PIT.

In Example 5, the subject matter of Example 4 includes, wherein a second interest packet is received after the interest packet, the second interest packet having the name to identify the content; and wherein the second interest packet is dropped in response to the interest packet being in the PIT.

In Example 6, the subject matter of Examples 4-5 includes, wherein the instructions further configure the processing circuitry to: receive a second interest packet, the second interest packet having the name to identify the content; determine that the PIT includes the interest packet with the name identifying the content; and drop the second interest in response to the determination.

In Example 7, the subject matter of Examples 1-6 includes, wherein the aggregate PDU session includes multiple flows, each of the multiple flows corresponding to a quality-of-service (QoS) level.

In Example 8, the subject matter of Example 7 includes, wherein the ICN packet includes a QoS level, and wherein, to transmit the ICN packet via the aggregate PDU session, the processing circuitry selects a flow with a corresponding QoS level.

In Example 9, the subject matter of Examples 1-8 includes, wherein the mobile network base station includes a cache with entries that each include a name and corresponding content.

In Example 10, the subject matter of Example 9 includes, wherein the instructions further configure the processing circuitry to: receive a second ICN packet from the UE, the second ICN packet being an interest packet with a name for content; match the name for content with an entry in the cache; retrieve content in the entry based on matching the name; and respond to the interest packet with a data packet that includes the content, wherein the processing circuitry does not transmit the interest packet via the aggregate PDU session in response to responding to the interest packet with content from the cache.

In Example 11, the subject matter of Examples 1-10 includes, wherein the aggregate PDU session is one of multiple aggregate PDU sessions established by the mobile network base station, each of the multiple aggregate PDU sessions established with a different ICN-GW within the CN.

In Example 12, the subject matter of Example 11 includes, wherein the ICN packet is an interest packet, and wherein, to identify the aggregate PDU session for the ICN packet the processing circuitry: uses a name contained in the ICN packet to locate an entry in a forwarding information base (FIB) of the mobile network base station; and identifies the aggregate PDU session from the entry in the FIB.

In Example 13, the subject matter of Examples 1-12 includes, wherein the mobile network base station is a gNB in accordance with a Third-Generation Partnership Project (3GPP) family of standards.

In Example 14, the subject matter of Example 13 includes, wherein the aggregate PDU session is established over an N3 GTP-U tunnel in accordance with the 3GPP family of standards.

Example 15 is a method for base station assisted information centric network (ICN), the method comprising: receiving, at a mobile network base station, an ICN packet from a user equipment (UE); identifying an aggregate packet data unit (PDU) session with a user plane function (UPF) ICN gateway (ICN-GW) hosted in a mobile network core network (CN) for the ICN packet; and transmitting the ICN packet via the aggregate PDU session.

In Example 16, the subject matter of Example 15 includes, establishing the aggregate PDU session in response to receiving the ICN packet, wherein the aggregate PDU session is not established when the ICN packet is received.

In Example 17, the subject matter of Examples 15-16 includes, receiving notification of a handover of the UE to the mobile network base station, the notification indicating the aggregate PDU session; and establishing the aggregate PDU session in response to the notification indicating the aggregate PDU session.

In Example 18, the subject matter of Examples 15-17 includes, wherein the mobile network base station includes a pending interest table (PIT), wherein the ICN packet is an interest packet with a name identifying content, and wherein the interest packet is placed in the PIT.

In Example 19, the subject matter of Example 18 includes, wherein a second interest packet is received after the interest packet, the second interest packet having the name to identify the content; and wherein the second interest packet is dropped in response to the interest packet being in the PIT.

In Example 20, the subject matter of Examples 18-19 includes, receiving a second interest packet, the second interest packet having the name to identify the content; determining that the PIT includes the interest packet with the name identifying the content; and dropping the second interest in response to the determination.

In Example 21, the subject matter of Examples 15-20 includes, wherein the aggregate PDU session includes multiple flows, each of the multiple flows corresponding to a quality-of-service (QoS) level.

In Example 22, the subject matter of Example 21 includes, wherein the ICN packet includes a QoS level, and wherein transmitting the ICN packet via the aggregate PDU session includes selecting a flow with a corresponding QoS level.

In Example 23, the subject matter of Examples 15-22 includes, wherein the mobile network base station includes a cache with entries that each include a name and corresponding content.

In Example 24, the subject matter of Example 23 includes, receiving a second ICN packet from the UE, the second ICN packet being an interest packet with a name for content; matching the name for content with an entry in the cache; retrieving content in the entry based on matching the name; and responding to the interest packet with a data packet that includes the content, wherein the mobile network base station does not transmit the interest packet via the aggregate PDU session in response to responding to the interest packet with content from the cache.

In Example 25, the subject matter of Examples 15-24 includes, wherein the aggregate PDU session is one of multiple aggregate PDU sessions established by the mobile network base station, each of the multiple aggregate PDU sessions established with a different ICN-GW within the CN.

In Example 26, the subject matter of Example 25 includes, wherein the ICN packet is an interest packet, and wherein identifying the aggregate PDU session for the ICN packet includes: using a name contained in the ICN packet to locate an entry in a forwarding information base (FIB) of the mobile network base station; and identifying the aggregate PDU session from the entry in the FIB.

In Example 27, the subject matter of Examples 15-26 includes, wherein the mobile network base station is a gNB in accordance with a Third-Generation Partnership Project (3GPP) family of standards.

In Example 28, the subject matter of Example 27 includes, wherein the aggregate PDU session is established over an N3 GTP-U tunnel in accordance with the 3GPP family of standards.

Example 29 is at least one machine readable medium including instructions for base station assisted information centric network (ICN), the instructions, when executed by processing circuitry, cause the processing circuitry to perform operations comprising: receiving, at a mobile network base station, an ICN packet from a user equipment (UE); identifying an aggregate packet data unit (PDU) session with a user plane function (UPF) ICN gateway (ICN-GW) hosted in a mobile network core network (CN) for the ICN packet; and transmitting the ICN packet via the aggregate PDU session.

In Example 30, the subject matter of Example 29 includes, wherein the operations comprise: establishing the aggregate PDU session in response to receiving the ICN packet, wherein the aggregate PDU session is not established when the ICN packet is received.

In Example 31, the subject matter of Examples 29-30 includes, wherein the operations comprise: receiving notification of a handover of the UE to the mobile network base station, the notification indicating the aggregate PDU session; and establishing the aggregate PDU session in response to the notification indicating the aggregate PDU session.

In Example 32, the subject matter of Examples 29-31 includes, wherein the mobile network base station includes a pending interest table (PIT), wherein the ICN packet is an interest packet with a name identifying content, and wherein the interest packet is placed in the PIT.

In Example 33, the subject matter of Example 32 includes, wherein a second interest packet is received after the interest packet, the second interest packet having the name to identify the content; and wherein the second interest packet is dropped in response to the interest packet being in the PIT.

In Example 34, the subject matter of Examples 32-33 includes, wherein the operations comprise: receiving a second interest packet, the second interest packet having the name to identify the content; determining that the PIT includes the interest packet with the name identifying the content; and dropping the second interest in response to the determination.

In Example 35, the subject matter of Examples 29-34 includes, wherein the aggregate PDU session includes multiple flows, each of the multiple flows corresponding to a quality-of-service (QoS) level.

In Example 36, the subject matter of Example 35 includes, wherein the ICN packet includes a QoS level, and wherein transmitting the ICN packet via the aggregate PDU session includes selecting a flow with a corresponding QoS level.

In Example 37, the subject matter of Examples 29-36 includes, wherein the mobile network base station includes a cache with entries that each include a name and corresponding content.

In Example 38, the subject matter of Example 37 includes, wherein the operations comprise: receiving a second ICN packet from the UE, the second ICN packet being an interest packet with a name for content; matching the name for content with an entry in the cache; retrieving content in the entry based on matching the name; and responding to the interest packet with a data packet that includes the content, wherein the mobile network base station does not transmit the interest packet via the aggregate PDU session in response to responding to the interest packet with content from the cache.

In Example 39, the subject matter of Examples 29-38 includes, wherein the aggregate PDU session is one of multiple aggregate PDU sessions established by the mobile network base station, each of the multiple aggregate PDU sessions established with a different ICN-GW within the CN.

In Example 40, the subject matter of Example 39 includes, wherein the ICN packet is an interest packet, and wherein identifying the aggregate PDU session for the ICN packet includes: using a name contained in the ICN packet to locate an entry in a forwarding information base (FIB) of the mobile network base station; and identifying the aggregate PDU session from the entry in the FIB.

In Example 41, the subject matter of Examples 29-40 includes, wherein the mobile network base station is a gNB in accordance with a Third-Generation Partnership Project (3GPP) family of standards.

In Example 42, the subject matter of Example 41 includes, wherein the aggregate PDU session is established over an N3 GTP-U tunnel in accordance with the 3GPP family of standards.

Example 43 is a system for base station assisted information centric network (ICN), the system comprising: means for receiving, at a mobile network base station, an ICN packet from a user equipment (UE); means for identifying an aggregate packet data unit (PDU) session with a user plane function (UPF) ICN gateway (ICN-GW) hosted in a mobile network core network (CN) for the ICN packet; and means for transmitting the ICN packet via the aggregate PDU session.

In Example 44, the subject matter of Example 43 includes, means for establishing the aggregate PDU session in response to receiving the ICN packet, wherein the aggregate PDU session is not established when the ICN packet is received.

In Example 45, the subject matter of Examples 43-44 includes, means for receiving notification of a handover of the UE to the mobile network base station, the notification indicating the aggregate PDU session; and means for establishing the aggregate PDU session in response to the notification indicating the aggregate PDU session.

In Example 46, the subject matter of Examples 43-45 includes, wherein the mobile network base station includes a pending interest table (PIT), wherein the ICN packet is an interest packet with a name identifying content, and wherein the interest packet is placed in the PIT.

In Example 47, the subject matter of Example 46 includes, wherein a second interest packet is received after the interest packet, the second interest packet having the name to identify the content; and wherein the second interest packet is dropped in response to the interest packet being in the PIT.

In Example 48, the subject matter of Examples 46-47 includes, means for receiving a second interest packet, the second interest packet having the name to identify the content; means for determining that the PIT includes the interest packet with the name identifying the content; and means for dropping the second interest in response to the determination.

In Example 49, the subject matter of Examples 43-48 includes, wherein the aggregate PDU session includes multiple flows, each of the multiple flows corresponding to a quality-of-service (QoS) level.

In Example 50, the subject matter of Example 49 includes, wherein the ICN packet includes a QoS level, and wherein the means for transmitting the ICN packet via the aggregate PDU session include means for selecting a flow with a corresponding QoS level.

In Example 51, the subject matter of Examples 43-50 includes, wherein the mobile network base station includes a cache with entries that each include a name and corresponding content.

In Example 52, the subject matter of Example 51 includes, means for receiving a second ICN packet from the UE, the second ICN packet being an interest packet with a name for content; means for matching the name for content with an entry in the cache; means for retrieving content in the entry based on matching the name; and means for responding to the interest packet with a data packet that includes the content, wherein the mobile network base station does not transmit the interest packet via the aggregate PDU session in response to responding to the interest packet with content from the cache.

In Example 53, the subject matter of Examples 43-52 includes, wherein the aggregate PDU session is one of multiple aggregate PDU sessions established by the mobile network base station, each of the multiple aggregate PDU sessions established with a different ICN-GW within the CN.

In Example 54, the subject matter of Example 53 includes, wherein the ICN packet is an interest packet, and wherein the means for identifying the aggregate PDU session for the ICN packet include: means for using a name contained in the ICN packet to locate an entry in a forwarding information base (FIB) of the mobile network base station; and means for identifying the aggregate PDU session from the entry in the FIB.

In Example 55, the subject matter of Examples 43-54 includes, wherein the mobile network base station is a gNB in accordance with a Third-Generation Partnership Project (3GPP) family of standards.

In Example 56, the subject matter of Example 55 includes, wherein the aggregate PDU session is established over an N3 GTP-U tunnel in accordance with the 3GPP family of standards.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for base station assisted information centric network (ICN), the device comprising:
   a memory including instructions; and
   processing circuitry that, when in operation, is configured by the instructions to:
      receive, at a mobile network base station, an ICN packet from a user equipment (UE);
      identify an aggregate packet data unit (PDU) session with a user plane function (UPF) ICN gateway (ICN-GW) hosted in a mobile network core network (CN) for the ICN packet; and
      transmit the ICN packet via the aggregate PDU session, wherein the instructions further configure the processing circuitry to:
         establish the aggregate PDU session in response to receiving the ICN packet, wherein the aggregate PDU session is not established when the ICN packet is received; or
         receive notification of a handover of the UE to the mobile network base station, the notification indicating the aggregate PDU session, and establish the aggregate PDU session in response to the notification indicating the aggregate PDU session.

2. The device of claim 1, wherein the mobile network base station includes a pending interest table (PIT), wherein the ICN packet is an interest packet with a name identifying content, and wherein the interest packet is placed in the PIT.

3. The device of claim 2, wherein a second interest packet is received after
   the interest packet, the second interest packet having the name to identify the content; and
   wherein the second interest packet is dropped in response to the interest packet being in the PIT.

4. The device of claim 1, wherein the mobile network base station includes a cache with entries that each include a name and corresponding content.

5. The device of claim 4, wherein the instructions further configure the processing circuitry to:

receive a second ICN packet from the UE, the second ICN packet being an interest packet with a name for content;

match the name for content with an entry in the cache;

retrieve content in the entry based on matching the name; and respond to the interest packet with a data packet that includes the content, wherein the processing circuitry does not transmit the interest packet via the aggregate PDU session in response to responding to the interest packet with content from the cache.

6. The device of claim 1, wherein the aggregate PDU session is one of multiple aggregate PDU sessions established by the mobile network base station, each of the multiple aggregate PDU sessions established with a different ICN-GW within the CN.

7. The device of claim 6, wherein the ICN packet is an interest packet, and wherein, to identify the aggregate PDU session for the ICN packet the processing circuitry:

uses a name contained in the ICN packet to locate an entry in a forwarding information base (FIB) of the mobile network base station; and identifies the aggregate PDU session from the entry in the FIB.

8. A method for base station assisted information centric network (ICN), the method comprising:

receiving, at a mobile network base station, an ICN packet from a user equipment (UE);

establishing an aggregate packet data unit (PDU) session in response to:

receiving the ICN packet, wherein the aggregate PDU session is not established when the ICN packet is received; or receiving notification of a handover of the UE to the mobile network base station, the notification indicating the aggregate PDU session;

identifying the aggregate PDU session with a user plane function (UPF) ICN gateway (ICN-GW) hosted in a mobile network core network (CN) for the ICN packet; and transmitting the ICN packet via the aggregate PDU session.

9. The method of claim 8, wherein the mobile network base station includes a pending interest table (PIT), wherein the ICN packet is an interest packet with a name identifying content, and wherein the interest packet is placed in the PIT.

10. The method of claim 9, wherein a second interest packet is received after the interest packet, the second interest packet having the name to identify the content; and wherein the second interest packet is dropped in response to the interest packet being in the PIT.

11. The method of claim 8, wherein the aggregate PDU session is one of multiple aggregate PDU sessions established by the mobile network base station, each of the multiple aggregate PDU sessions established with a different ICN-GW within the CN.

12. The method of claim 11, wherein the ICN packet is an interest packet, and wherein identifying the aggregate PDU session for the ICN packet includes:

using a name contained in the ICN packet to locate an entry in a forwarding information base (FIB) of the mobile network base station; and identifying the aggregate PDU session from the entry in the FIB.

13. At least one non-transitory machine readable medium including instructions for base station assisted information centric network (ICN), the instructions, when executed by processing circuitry, cause the processing circuitry to perform operations comprising:

receiving, at a mobile network base station, an ICN packet from a user equipment (UE);

establishing an aggregate packet data unit (PDU) session in response to:

receiving the ICN packet, wherein the aggregate PDU session is not established when the ICN packet is received; or receiving notification of a handover of the UE to the mobile network base station, the notification indicating the aggregate PDU session;

identifying the aggregate PDU session with a user plane function (UPF) ICN gateway (ICN-GW) hosted in a mobile network core network (CN) for the ICN packet; and transmitting the ICN packet via the aggregate PDU session.

14. The at least one non-transitory machine readable medium of claim 13, wherein the mobile network base station includes a pending interest table (PIT), wherein the ICN packet is an interest packet with a name identifying content, and wherein the interest packet is placed in the PIT.

15. The at least one non-transitory machine readable medium of claim 14, wherein a second interest packet is received after the interest packet, the second interest packet having the name to identify the content; and wherein the second interest packet is dropped in response to the interest packet being in the PIT.

16. The at least one non-transitory machine readable medium of claim 13, wherein the mobile network base station includes a cache with entries that each include a name and corresponding content.

17. The at least one non-transitory machine readable medium of claim 16, wherein the operations comprise:

receiving a second ICN packet from the UE, the second ICN packet being an interest packet with a name for content;

matching the name for content with an entry in the cache;

retrieving content in the entry based on matching the name; and responding to the interest packet with a data packet that includes the content, wherein the mobile network base station does not transmit the interest packet via the aggregate PDU session in response to responding to the interest packet with content from the cache.

18. The at least one non-transitory machine readable medium of claim 13, wherein the aggregate PDU session is one of multiple aggregate PDU sessions established by the mobile network base station, each of the multiple aggregate PDU sessions established with a different ICN-GW within the CN.

19. The at least one non-transitory machine readable medium of claim 18, wherein the ICN packet is an interest packet, and wherein identifying the aggregate PDU session for the ICN packet includes:

using a name contained in the ICN packet to locate an entry in a forwarding information base (FIB) of the mobile network base station; and identifying the aggregate PDU session from the entry in
the FIB.

20. The device of claim 1, wherein the mobile network base station is a gNB in accordance with a Third-Generation Partnership Project (3GPP) family of standards.

21. The device of claim 20, wherein the aggregate PDU session is established over an N3 GTP-U tunnel in accordance with the 3GPP family of standards.

22. The method of claim 8, wherein the mobile network base station is a gNB in accordance with a Third-Generation Partnership Project (3GPP) family of standards.

23. The method of claim 22, wherein the aggregate PDU session is established over an N3 GTP-U tunnel in accordance with the 3GPP family of standards.

24. The at least one non-transitory machine readable medium of claim 13, wherein the mobile network base station is a gNB in accordance with a Third-Generation Partnership Project (3GPP) family of standards.

25. The at least one non-transitory machine readable medium of claim 24, wherein the aggregate PDU session is established over an N3 GTP-U tunnel in accordance with the 3GPP family of standards.

\* \* \* \* \*